(12) United States Patent
Burmester et al.

(10) Patent No.: US 12,188,565 B2
(45) Date of Patent: Jan. 7, 2025

(54) VALVE DEVICE

(71) Applicant: GEA Tuchenhagen GmbH, Büchen (DE)

(72) Inventors: Jens Burmester, Grambek (DE); Stephan Dirks, Schwarzenbek (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 18/006,063

(22) PCT Filed: Jul. 12, 2021

(86) PCT No.: PCT/EP2021/069356
§ 371 (c)(1),
(2) Date: Jan. 19, 2023

(87) PCT Pub. No.: WO2022/017856
PCT Pub. Date: Jan. 27, 2022

(65) Prior Publication Data
US 2023/0349468 A1 Nov. 2, 2023

(30) Foreign Application Priority Data
Jul. 21, 2020 (DE) .................. 10 2020 004 369.0

(51) Int. Cl.
*F16K 1/36* (2006.01)
*F16K 1/42* (2006.01)
(Continued)

(52) U.S. Cl.
CPC .................. *F16K 1/36* (2013.01); *F16K 1/42* (2013.01); *F16K 31/122* (2013.01); *F16K 1/46* (2013.01)

(58) Field of Classification Search
CPC ..... F16K 1/36; F16K 1/42; F16K 1/46; F16K 31/122; F16K 31/1228; F16K 27/02; F16K 29/0083
See application file for complete search history.

(56) References Cited

U.S. PATENT DOCUMENTS 757,146 A * 4/1904 Sanderson ............ F16K 31/122
251/63
3,211,418 A 10/1965 Klinger-Lohr
(Continued)

FOREIGN PATENT DOCUMENTS

DE 33 42 405 A1 6/1985
EP 1 592 905 A1 11/2005
(Continued)

OTHER PUBLICATIONS

International Search Report in PCT/EP2021/069356, mailed Oct. 19, 2021, and its English translation, 4 pgs.

*Primary Examiner* — Patrick C Williams
(74) *Attorney, Agent, or Firm* — Young Basile Hanlon & MacFarlane, P.C.

(57) ABSTRACT

A valve device, in particular a lifting valve device, includes a housing, a valve seat, and a movable closing body that can be brought into an open position in an opening movement and into a closed position in a closing movement. In the closed position, the closing body and the valve seat are in sealing contact. The valve device also includes a piston to which a pressure medium can be applied and that is received in a cylinder. To improve hygienic properties, it is proposed that the cylinder is part of the closing body.

19 Claims, 4 Drawing Sheets

(51) Int. Cl.
*F16K 1/46* (2006.01)
*F16K 31/122* (2006.01)

(56) References Cited

U.S. PATENT DOCUMENTS

| | | | |
|---|---|---|---|
| 4,343,456 A * | 8/1982 | Zitzloff | F16K 27/02 251/255 |
| 2020/0232484 A1 * | 7/2020 | De Carolis | F16K 37/0083 |

FOREIGN PATENT DOCUMENTS

| | | |
|---|---|---|
| WO | 2004/070245 A1 | 8/2004 |
| WO | 2009/100920 A1 | 8/2009 |
| WO | 2017/076411 A1 | 5/2017 |
| WO | 2017/088938 A1 | 6/2017 |

* cited by examiner

VALVE DEVICE

TECHNICAL FIELD

The invention relates to a valve device.

BACKGROUND

Fluids having powdered constituents represent a challenge for process engineering. Fluids of this kind appear, for example, in spray-drying systems of food technology. Because of this field of application, such systems are subjected to the highest standards in terms of hygienic conditions. To maintain the highest standards, so-called "cleaning-in-place" (CIP) is carried out.

The components of the spray-drying and process system should therefore be designed such that few to no deposits can form therein from the outset, and such that they can be cleaned well during CIP. The components include valve devices for switching the fluid flow, for example lifting valve devices.

A lifting valve that has a closing body and that is designed for this application is disclosed in WO 2017/076411 A1. On an end face, the closing body has a contour that is adapted to a contour of the tank or line to which the lifting valve is connected. A flushing channel that surrounds the closing body is arranged between a seal, which surrounds the closing body and cooperates with a valve seat, and the tank.

A compact lifting valve that is easy to clean is presented in WO 2009/100920 A1. The spring assembly of a pneumatic drive for the closing body is integrated at least in portions in the closing body. WO 2017/088938 presents how the concept of WO 2009/100920 A1 can advantageously be used in the above-mentioned applications with powdered media.

SUMMARY

The object was therefore to provide a valve device having improved hygienic properties and improved CIP capability.

This object is solved by a valve device according to the teachings herein.

The starting point is a valve device, in particular a lifting valve device, comprising a housing, a valve seat, a movable closing body that can be brought into an open position in an opening movement and into a closed position in a closing movement along a stroke axis, in which closed position the closing body and the valve seat are in sealing contact, and comprising a piston to which a pressure medium can be applied and which is received in a cylinder. Said valve device is designed such that the cylinder is part of the closing body. In contrast to conventional pneumatic drives, the piston according to the claimed solution is a stationary component while the cylinder is moved as part of the closing body. As such, the drive for the closing body, or rather a valve device, is integrated in said closing body. The valve device is therefore compact in design. This results in a reduction in the area of the closing body that is in contact with the product and, in turn, better cleanability and thus improved CIP capability. The valve device can also be manufactured in a cost-effective manner. These advantages arise to a large extent, because a part of the drive to which a pressure medium can be applied is integrated in the closing body and thus no installation space is required for a spring assembly.

One development relates to the guidance of the pressure medium for application to the piston. According to a cost-effective solution, the piston is connected to an inner hollow rod that accommodates an air channel that passes through the inner hollow rod and the piston and that is connected to a first pressure chamber surrounded by the piston and the cylinder. Said hollow rod may extend along the stroke axis. The pressure medium is supplied in this way via a stationary component, which is advantageously simple to implement.

According to another development, it is provided that the closing body extends through a housing part and a first sliding bearing and a second sliding bearing are provided that are arranged at opposite ends of the housing part. The aim is to achieve a distance between the sliding bearings that prevents tilting toward the stroke axis. However, the distance should not unnecessarily increase the space required by the valve device. Therefore, said distance may approximate a diameter of the piston or closing body, wherein the diameter is measured in a plane perpendicular to the stroke axis. Advantageously, the distance approximates one third to one half of a length of the closing body along the stroke axis.

In another development, the valve device is designed such that a seal that is received in a groove on the closing body to fill said groove and a valve seat are designed to be semi-axial. This design ensures improved centering of the closing body in the closed position of the valve.

In another development, an annular channel surrounding the closing body is arranged between a housing part and the closing body. A flushing or barrier medium can be applied to said annular channel, for example a flushing gas such as sterile air. This advantageously allows for deposits in the region of the passage to be significantly reduced, for example in application involving powdered media.

The previous development is additionally improved in that, from the annular channel to a connection, a choke gap is formed between the housing part and the closing body. The connection has a longitudinal axis that is different from the stroke axis. Flushing or barrier medium can flow through said choke gap against the product flow and thus reduce deposits to a large extent.

According to another development of the valve device, it comprises a guide rod that extends in parallel with a stroke axis and is surrounded at least in portions by a plate provided on the closing body in a plane to which the stroke axis is perpendicular. A form fit is produced between the plate and the guide rod in a circumferential direction around the stroke axis. This prevents the closing body from rotating about the stroke axis. This is advantageous, for example, for designing components and adapting them to one another, wherein unwanted gaps between the components can be largely prevented and desired gaps can be reliably created, for example the choke gap.

In another development, the valve device is designed such that a first housing part comprises a first flange that is brought together with a second flange provided on a second housing part, and a bolt is provided that is engaged with each of the two flanges. This arrangement ensures the spatial assignment of the components to one another and in particular prevents the flanges from being installed so as to be rotated with respect to one another. This also simplifies adaptation of the components to one another and thus produces higher accuracy and thus better hygienic properties.

Another improvement of the valve device is achieved in that an end face of the closing body is designed to be aligned with, or rather flush with, an inner wall of a connection. This makes it possible to clean the closing body and inner wall in one go, for example with a pipeline pig. This development is particularly effective in conjunction with the developments that prevent rotation of the closing body and flange about the stroke axis.

Incorporation of the valve device in a process system is improved in that the valve device comprises a sensor system having a first position sensor and a second position sensor, which are arranged at opposite ends of a displacement path of the closing body.

BRIEF DESCRIPTION OF THE DRAWINGS

The invention will be explained in more detail on the basis of an embodiment and its further embodiments. In addition, the presentation of the advantages is explained in more detail in the figures.

DETAILED DESCRIPTION

Figure 1:
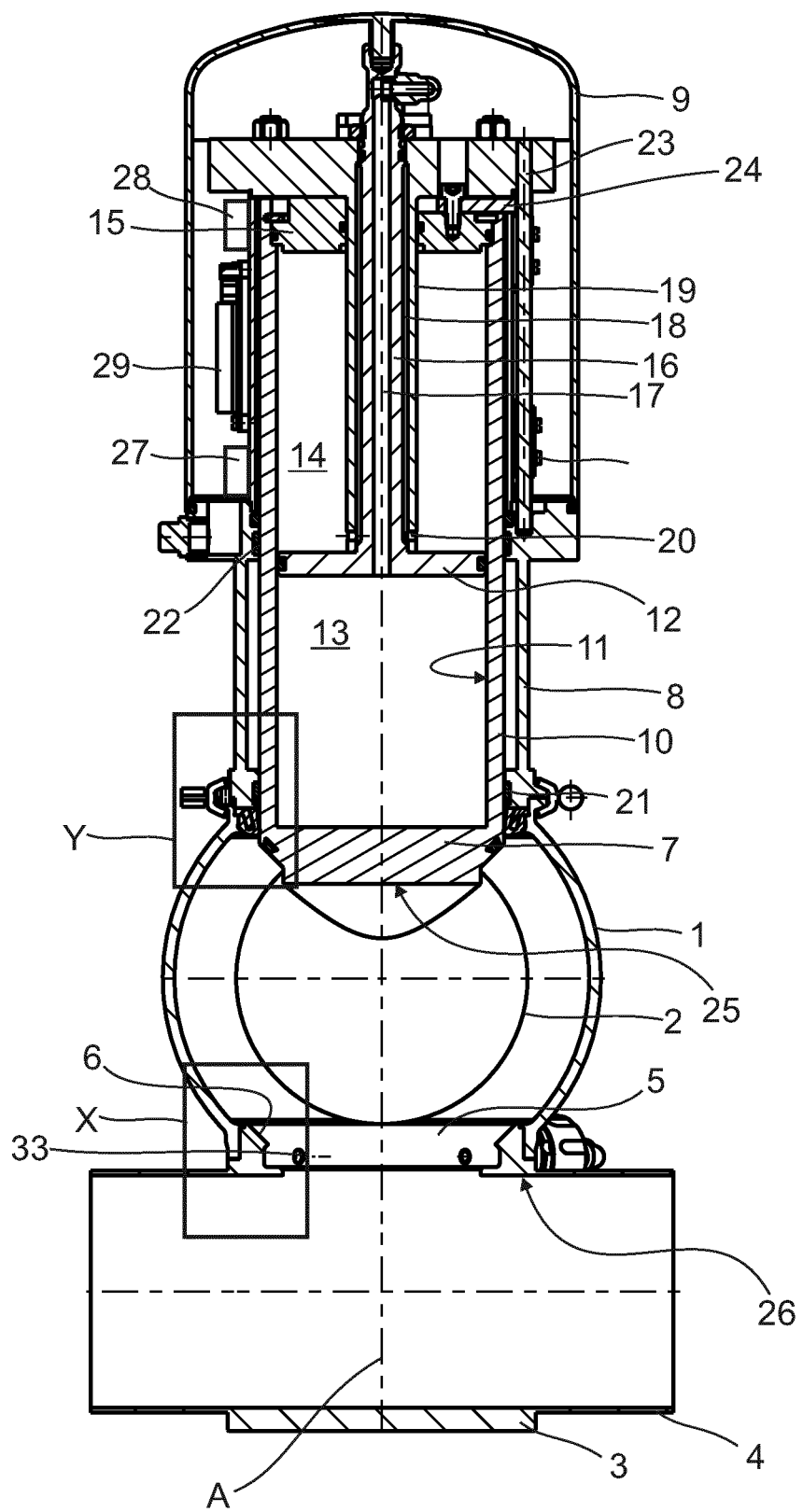
FIG. 1 shows a section through a valve device in an open position thereof.

FIG. 1 shows a valve device having a multi-part housing. A first housing part 1 comprises a first connection 2. A second connection 4 is provided in the second housing part 3. A passage 5 is provided between the connections 2 and 4.

A valve seat 6 is arranged in the passage 5. The valve device comprises a closing body 7, which can be brought into sealing contact with the valve seat 6 in order to close a fluid connection between the first connection 2 and the second connection 4. By releasing the sealing contact, the fluid connection can be re-established.

The closing body 7 extends through a third housing part 8 of the valve device and can be displaced into an interior of a hood 9. A cylinder 10 having a running surface 11 is provided in the closing body 7 on the side thereof facing away from the passage 5. A piston 12 that is in sealing and displaceable contact with the running surface 11 divides a volume of the cylinder 10 into a first pressure chamber 13 and a second pressure chamber 14. A cover 15 seals the cylinder in an airtight manner.

The piston 12 is connected to an inner hollow rod 16, which accommodates an air channel 17, which passes through the inner hollow rod 16 and the piston 12 and is connected to the first pressure chamber 13. The inner hollow rod 16 is received in an outer hollow rod 19 to form an air gap 18. At least one bore 20 in the outer hollow rod 19 connects the air gap 18 to the second pressure chamber 14.

As soon as a pressure medium, for example pneumatic air, is fed through the air channel 17 into the first pressure chamber 13 and the pressure in the first pressure chamber 13 exceeds the pressure in the second pressure chamber 14, the closing body 7 is moved toward the valve seat 6 and finally brought into sealing contact therewith. The valve device is now in a closed position shown in FIG. 2. The fluid connection between the connections 2 and 4 is closed. Preferably, the second pressure chamber 14 is vented in this step.

Conversely, a pressure medium can be supplied to the second pressure chamber 14 via the air gap 18 and the bore 20. If the pressure in the second pressure chamber 14 exceeds the pressure in the first pressure chamber 13, the closing body moves into the open position shown in FIG. 1. The first pressure chamber 13 can be vented in this step.

During the movements of the closing body 7, the cylinder 10 moves while the piston 12 can remain stationary, preferably remains stationary.

Because of this design, the means required for shifting the closing body 7, also referred to as the drive, is integrated in a compact manner in the valve device. The closing body 7 is part of the drive. This design is manufactured and maintained in a simple and cost-effective manner. Another advantage is that the closing body 7 can be guided on a large diameter, such that narrow gap dimensions can be maintained, for example in the region of the valve seat 6.

A first and a second sliding bearing 21 and 22, for example, are provided for the guidance, which sliding bearings are arranged at opposite ends of the third housing part 8 and can be shaped in the manner of a strip, so as to surround the cylinder 10. Good guidance of the closing body 7 is achieved in that the sliding bearing 21 and 22 are at a distance from one another in the direction of the stroke axis A that is in the range of a diameter of the piston measured transversely to the stroke axis A or in the range of an outer diameter of the closing body 7 measured transversely to the stroke axis A and in the range of the cylinder 10.

The closing body 7 can be designed to be secured against rotation against a stroke axis A. For this purpose, a guide rod 23 that extends parallel to the stroke axis A is provided below the hood 9. Said guide rod 23 is surrounded at least in portions by a plate 24 fastened to the closing body 7 in a plane to which the stroke axis A is perpendicular, such that a form fit is produced that suppresses the rotation of the closing body 7 about the stroke axis but that allows for a movement along the stroke axis A. In this arrangement, the anti-rotation mechanism is implemented on a large diameter that is greater than the diameter of the cylinder 10. This produces a high degree of accuracy. Since the anti-rotation mechanism is arranged outside the region that conveys the pressure medium or product, there is no need for additional sealing measures.

A sensor system can be provided under the hood 9, by means of which sensor system the position of the closing body 7 can be detected. The sensor system may, for example, comprise a first position sensor 27 and a second position sensor 28. The position sensors 27 and 28 are arranged at opposite ends of the displacement path of the closing body. They may be designed as proximity switches that cooperate with a matching target mounted on the cylinder 10. A third position sensor may be provided between the first position sensor 27 and the second position sensor 28, by means of which third position sensor an intermediate position of the closing body can be detected. The intermediate position can be achieved by correspondingly applying the pressure medium to both sides of the piston. An intermediate position can be advantageous during cleaning in order to disrupt the flow of cleaning agent in a targeted manner, for example in order to stimulate the formation of vortices. Said vortices can then improve the removal of deposits.

The anti-rotation design allows for an end face 25 of the closing body 7 to be adapted to an inner wall 26 of the second connection 4, for example so as to be aligned therewith, such that the end face 25 forms a wall portion of the inner wall 26 in the closed position of the closing body 7. This improves the cleanability of the valve device. If the second connection 4 is designed, for example, as a line, an arrangement that can be cleaned with a pig is produced. Insofar as the design of the end face 25 flush with the inner wall 26 creates a region of static flow on the closing body 7, at least one transverse bore can be provided in the closing body 7, which transverse bore connects the region of static flow to a part of the closing body 7 that is in contact with the flow, for example the end face 25.

Figure 2:
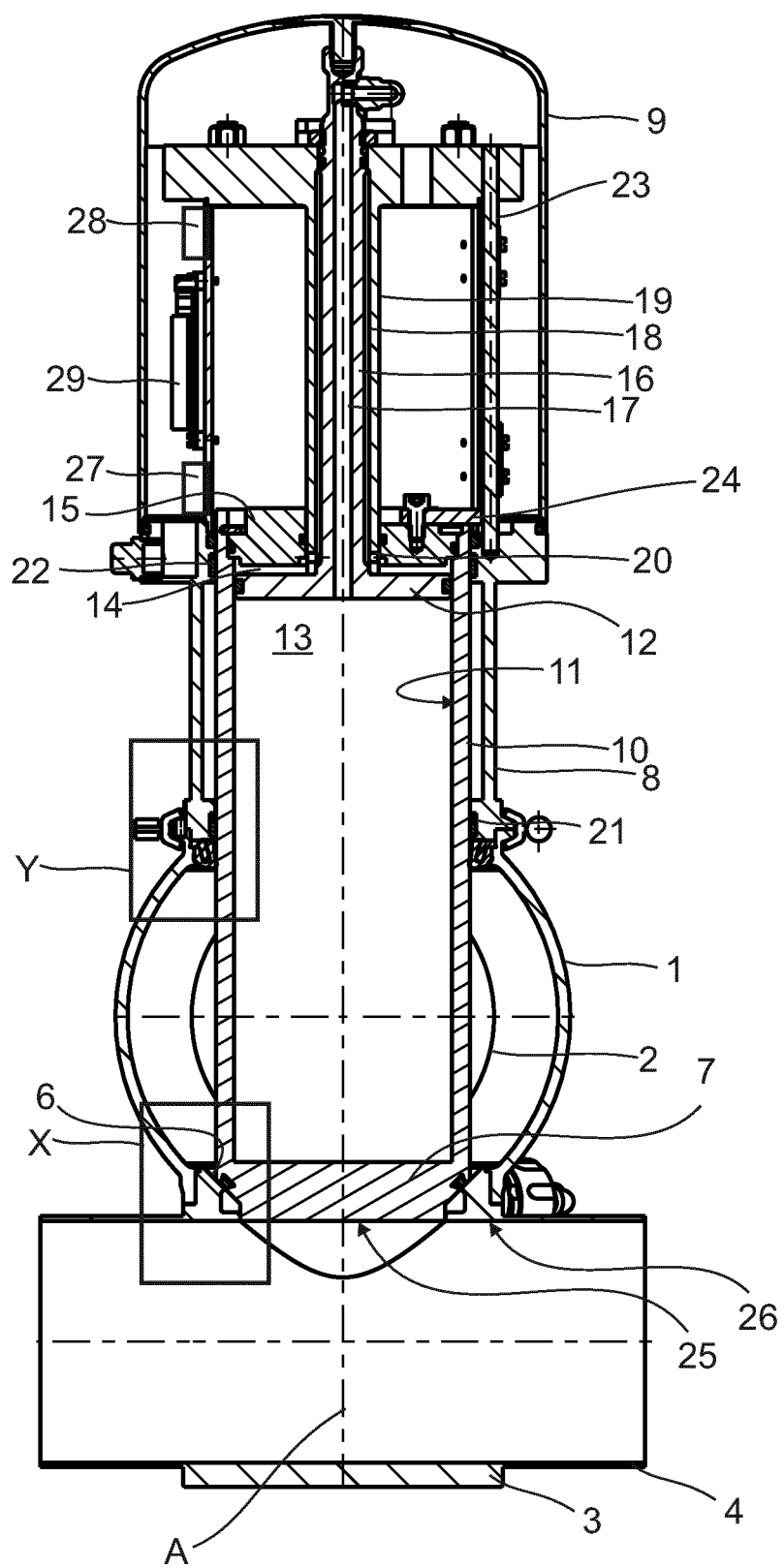
FIG. 2 shows a section through the valve device of FIG. 1 in a closed position thereof.
Figure 3:
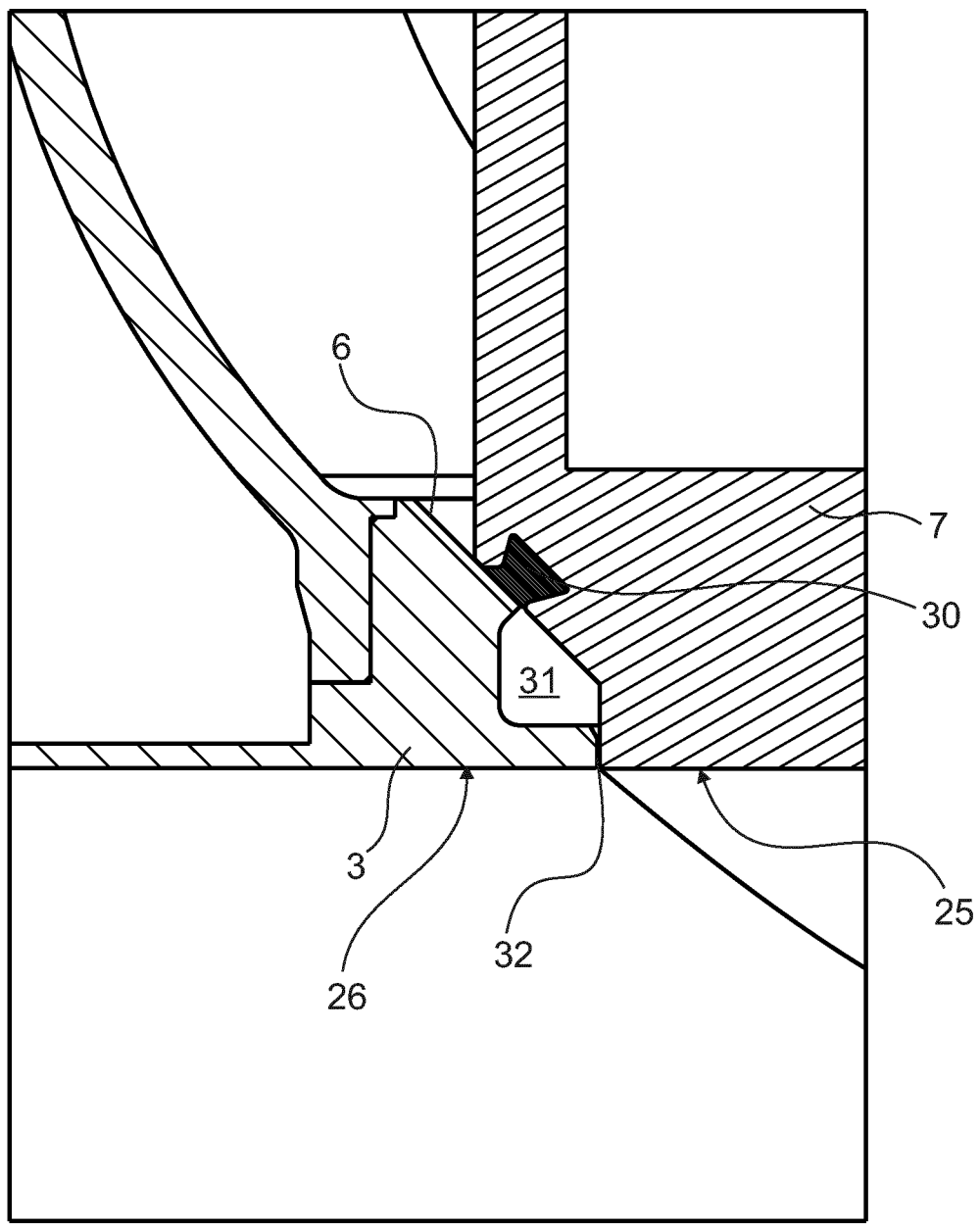
FIG. 3 shows a view of the detail X, of a valve seat region of the valve device of FIG. 1.

FIG. 3 shows the detail X from FIGS. 1 and 2 magnified. The detail X is shown in the closed position according to FIG. 2.

A seal 30, which is received in a groove on the closing body 7 so as to fill said groove, is in contact with the valve seat 6 and seals the valve seat 6 off from the closing body 7 in a fluid-tight manner. The seal 30 and the valve seat 6 may be designed to be semi-axial, which improves the centering of the closing body 7 in the valve seat 6.

An annular channel 31 surrounding the closing body 7 is arranged between the second housing part 3 and the closing body 7. Said annular channel is preferably in a plane to which the stroke axis A is perpendicular, wherein an axis of symmetry of the rotationally symmetrical ring coincides with the stroke axis A.

The contact between the valve seat 6 and the closing body 7 seals the annular channel off in the direction of fluid flow toward the first connection 2. The seal 30 may be arranged so as to immediately adjoin the annular channel 31.

A choke gap 32 is formed between the second housing part 3 and the closing body 7 in the direction of fluid flow from the annular channel 31 toward the second connection 4. The choke gap 32 allows for a slight flow out of the annular channel 31 through the choke gap 32 in the direction of the second connection 4. The guidance and mounting of the closing body 7 in the first and second sliding bearing 21 and 22 over a wide diameter as well as the anti-rotation mechanism make it possible to implement the choke gap 32 along a complete circumference of the closing body 7 and to adapt a width of said choke gap as required.

At least one inlet 33 opens out into the annular channel 31, preferably multiple inlets are distributed along the annular channel 31 in the circumferential direction, advantageously in an equidistant arrangement. It has been shown that a particularly good result can be achieved with four inlets distributed at equal distances. The inlets can clearly be seen in FIG. 1 in the open position of the valve device. A medium that escapes through the choke gap 32 can be admitted through the inlet 33. The medium may, for example, be a sealing gas, which prevents dirt from settling in the annular channel 31 and choke gap 32. Alternatively, or in a second method step, the medium may be a cleaning agent.

Figure 4:
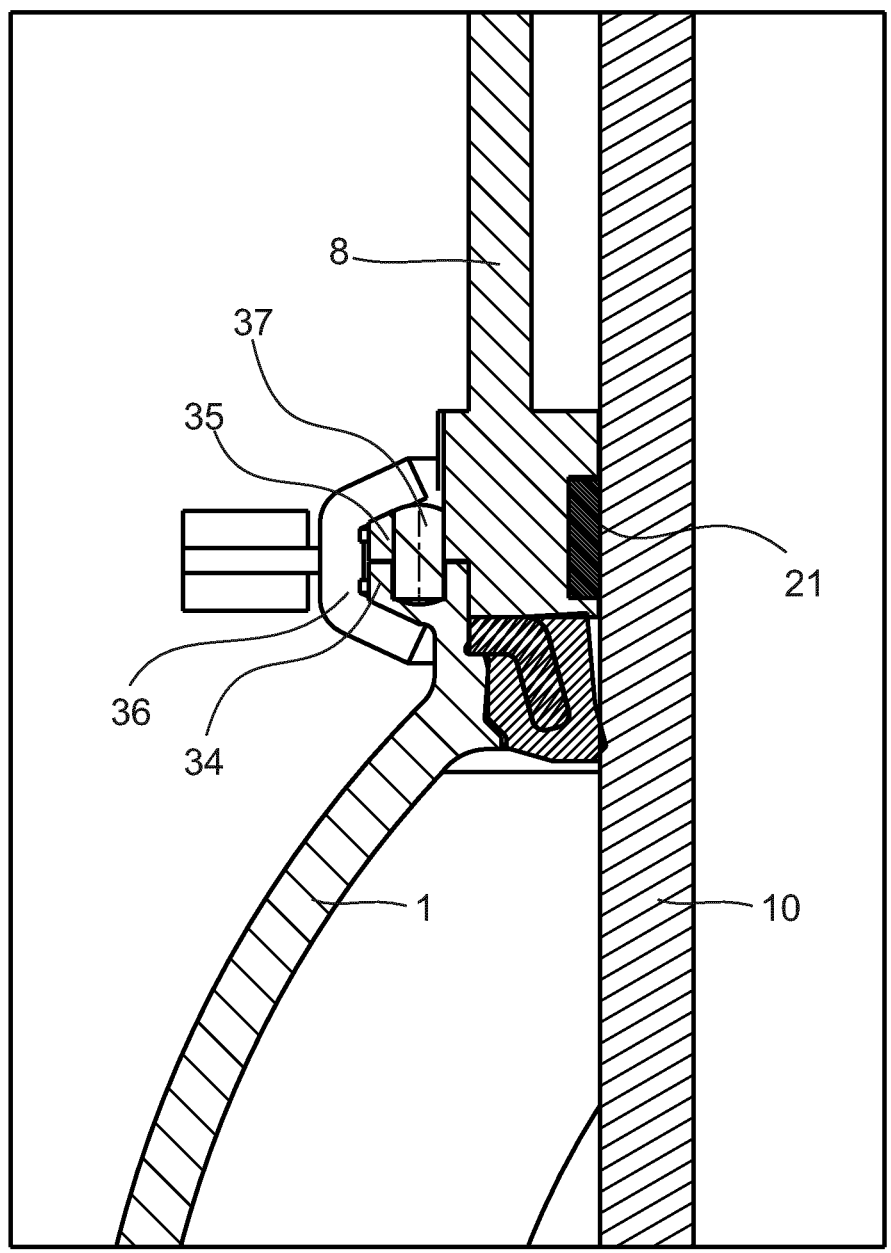
FIG. 4 shows a view of the detail Y, of a flange connection of the valve device of FIG. 1.

FIG. 4 shows the detail Y from FIGS. 1 and 2 magnified.

The first housing part 1 comprises a first flange 34, which is brought together with a second flange 35, which is arranged on a second housing part 3. A clamp 36 releasably presses the flanges 34 and 35 together. In order that the flange 34 and 35 cannot be rotated relative to one another, a bolt 37 that is engaged with each of the two flanges 34 and 35 is provided. This is advantageous in the case of a non-rotationally symmetrical end face 25 of the closing body 7, to orient the closing body 7. This design cooperates with the above-described anti-rotation mechanism with the guide rod 23 and plate 24 and consolidates its advantages.

The following is a list of reference signs used in this specification and in the drawing figures.

1 First housing part
2 First connection
3 Second housing part
4 Second connection
5 Passage
6 Valve seat
7 Closing body
8 Third housing part
9 Hood
10 Cylinder
11 Running surface
12 Piston
13 First pressure chamber
14 Second pressure chamber
15 Cover
16 Inner hollow rod
17 Air channel
18 Air gap
19 Outer hollow rod
20 Bore
21 First sliding bearing
22 Second sliding bearing
23 Guide rod
24 Plate
25 End face
26 Inner wall
27 First position sensor
28 Second position sensor
29 Electronics
30 Seal
31 Annular channel
32 Choke gap
33 Inlet
34 First flange
35 Second flange
36 Clamp
37 Bolt
A Stroke axis
X Detail
Y Detail

The invention claimed is:

1. A valve device, in particular a lifting valve device, comprising:
   a housing;
   a valve seat;
   a movable closing body that can be brought into an open position in an opening movement and into a closed position in a closing movement along a stroke axis, wherein in the closed position the closing body and the valve seat are in sealing contact;
   an annular channel surrounding the closing body and arranged between a housing part and the closing body;
   from the annular channel to a connection, a choke gap is formed between the housing part and the closing body; and
   a piston to which a pressure medium can be applied and that is received in a cylinder, wherein the cylinder is part of the closing body,
   wherein the connection has a longitudinal axis that is different from the stroke axis, and
   wherein an end face of the closing body is designed to be aligned with an inner wall of the connection.

2. The valve device according to claim 1, wherein the piston is connected to an inner hollow rod that accommodates an air channel that passes through the inner hollow rod and the piston and that is connected to a first pressure chamber surrounded by the piston and the cylinder.

3. The valve device according to claim 2, comprising:
   a seal received in a groove on the closing body to fill the groove; and
   a valve seat designed to be semi-axial.

4. The valve device according to claim 2, comprising:
a guide rod that extends in parallel with the stroke axis and is surrounded at least in portions by a plate provided on the closing body in a plane to which the stroke axis is perpendicular.

5. The valve device according to claim 2, comprising:
a first housing part that includes a first flange brought together with a second flange provided on a second housing part; and
a bolt engaged with each of the first flange and the second flange.

6. The valve device according to claim 2, wherein an end face of the closing body is flush with an inner wall of a connection.

7. The valve device according to claim 2, comprising:
a sensor system including a first position sensor and a second position sensor that are arranged at opposite ends of a displacement path of the closing body.

8. The valve device according to claim 2, wherein the closing body extends through a housing part, and a first sliding bearing and a second sliding bearing are arranged at opposite ends of the housing part.

9. The valve device according to claim 1, comprising:
a seal received in a groove on the closing body to fill the groove; and
a valve seat designed to be semi-axial.

10. The valve device according to claim 1, comprising:
a guide rod that extends in parallel with the stroke axis and is surrounded at least in portions by a plate provided on the closing body in a plane to which the stroke axis is perpendicular.

11. The valve device according to claim 1, comprising:
a first housing part that includes a first flange brought together with a second flange provided on a second housing part;
and a bolt engaged with each of the first flange and the second flange.

12. The valve device according to claim 1, wherein the end face of the closing body is flush with the inner wall of the connection.

13. The valve device according to claim 1, comprising:
a sensor system including a first position sensor and a second position sensor that are arranged at opposite ends of a displacement path of the closing body.

14. The valve device according to claim 1, wherein the closing body extends through a housing part and a first sliding bearing and a second sliding bearing are arranged at opposite ends of the housing part.

15. The valve device according to claim 14, comprising:
a seal received in a groove on the closing body to fill the groove; and
a valve seat designed to be semi-axial.

16. A valve device, in particular a lifting valve device, comprising:
a housing;
a valve seat;
a movable closing body that can be brought into an open position in an opening movement and into a closed position in a closing movement, wherein in the closed position the closing body and the valve seat are in sealing contact; and
a piston to which a pressure medium can be applied and that is received in a cylinder, wherein the cylinder is part of the closing body,
wherein the closing body extends through a housing part, and a first sliding bearing and a second sliding bearing are arranged at opposite ends of the housing part.

17. The valve device according to claim 16, comprising:
a seal received in a groove on the closing body to fill the groove; and
a valve seat designed to be semi-axial.

18. The valve device according to claim 16, comprising:
an annular channel surrounding the closing body and arranged between a housing part and the closing body.

19. A valve device, in particular a lifting valve device, comprising:
a housing;
a valve seat;
a movable closing body that can be brought into an open position in an opening movement and into a closed position in a closing movement, wherein in the closed position the closing body and the valve seat are in sealing contact; and
a piston to which a pressure medium can be applied and that is received in a cylinder, wherein the cylinder is part of the closing body,
wherein the piston is connected to an inner hollow rod that accommodates an air channel that passes through the inner hollow rod and the piston and that is connected to a first pressure chamber surrounded by the piston and the cylinder, and
wherein the closing body extends through a housing part, and a first sliding bearing and a second sliding bearing are arranged at opposite ends of the housing part.

* * * * *